(12) United States Patent
Hall et al.

(10) Patent No.: US 6,356,543 B2
(45) Date of Patent: Mar. 12, 2002

(54) CONTROLLING MOBILE PHONE SYSTEM USER VIEWS FROM THE WORLD-WIDE WEB

(75) Inventors: Hans Hall, Uppsala; Michael Eriksson, Solna, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/978,466

(22) Filed: Nov. 25, 1997

(51) Int. Cl.⁷ .................. H04L 12/66; H04M 3/42
(52) U.S. Cl. ............... 370/352; 370/328; 455/414; 709/209; 709/223; 379/93.12; 379/201
(58) Field of Search ................. 370/351, 352, 370/328, 338, 409; 455/414, 415, 416, 417, 418, 419, 420, 556, 566; 709/223, 209, 219–225; 379/201, 88.17, 220, 93.12

(56) References Cited

U.S. PATENT DOCUMENTS

| | | | |
|---|---|---|---|
| 4,927,789 A | | 5/1990 | Shirley, Jr. et al. ........... 455/67 |
| 5,297,192 A | | 3/1994 | Gerszberg .................... 379/59 |
| 5,572,572 A | | 11/1996 | Kawan et al. ................ 379/98 |
| 5,629,978 A | | 5/1997 | Blumhardt et al. ......... 379/201 |
| 5,633,912 A | | 5/1997 | Tsoi ............................ 379/58 |
| 5,758,295 A | * | 5/1998 | Ahlberg et al. ............. 455/566 |
| 5,870,683 A | * | 2/1999 | Wells et al. ................. 455/566 |
| 5,878,339 A | * | 3/1999 | Zicker et al. ............... 455/419 |
| 5,887,254 A | * | 3/1999 | Halonen ...................... 455/419 |
| 5,915,008 A | * | 6/1999 | Dulman ...................... 379/201 |
| 5,917,817 A | * | 6/1999 | Dunn et al. ................. 370/352 |
| 5,918,214 A | * | 6/1999 | Perkowski ............... 379/63.12 |
| 5,933,778 A | * | 8/1999 | Buhrmann et al. ......... 455/417 |
| 5,940,752 A | * | 8/1999 | Henrick ...................... 455/419 |
| 5,958,016 A | * | 9/1999 | Chang et al. ............... 709/229 |
| 5,974,311 A | * | 10/1999 | Lipsit ......................... 455/418 |
| 5,999,973 A | * | 12/1999 | Glitho et al. ............... 709/223 |
| 6,014,561 A | * | 1/2000 | Molne ........................ 455/419 |
| 6,031,904 A | * | 2/2000 | An et al. .................... 370/352 |

FOREIGN PATENT DOCUMENTS

| | | | |
|---|---|---|---|
| FI | 964200 | 11/1997 | |
| WO | 9732439 | 9/1997 | ............ H04Q/7/32 |
| WO | 9744943 | 11/1997 | ............ H04M/3/42 |

\* cited by examiner

*Primary Examiner*—Wellington Chin
*Assistant Examiner*—Steven Nguyen
(74) *Attorney, Agent, or Firm*—Jenkens & Gilchrist

(57) ABSTRACT

A method and system are disclosed whereby a mobile phone user can select one or more service preferences for the mobile phone from a simulated mobile phone display on an Internet web page. The user can access the web page from a personal or business computer. Once the selection has been made, the user can save the preferences to a server in the mobile phone network. The server contains (or provides links to) the full complement of services that are available for selection. The selected services' applications are downloaded from the server to the mobile phone (via the network) either immediately (if a network connection is already made) or the next time the phone is turned on. Consequently, the user can readily obtain the services desired, and also customize the display and "look and feel" of the mobile phone.

23 Claims, 2 Drawing Sheets

CONTROLLING MOBILE PHONE SYSTEM USER VIEWS FROM THE WORLD-WIDE WEB

BACKGROUND OF THE INVENTION

1. Technical Field of the Invention

The present invention relates in general to the telecommunications field and, in particular, to a method and system for using the World-Wide Web (WWW) to define certain mobile phone services a user may desire (or needs) to see on a mobile phone display.

2. Description of Related Art

Existing telephone systems typically offer a multitude of complicated services to users. However, the users typically are interested in only relatively few of the services being offered. In that regard, the GF788 mobile phone system manufactured by Telefonaktiebolaget L M Ericsson allows a user to decide just what items are to be shown in the mobile phone's menu display, and input that information directly into the phone. On the other hand, some existing mobile phone systems require the use of a graphical user interface for a computer to determine what type of "low-level" phone services a particular mobile phone will provide. An example of such a "low-level" phone service is a routing service that forwards a call from one phone to another depending on the identity of the party who placed the call.

A problem encountered with the existing mobile phone systems is that users now want to decide for themselves just what services will be displayed on their mobile phones. These services can be "low-level" or "high-level" services (e.g., services displayed on a so-called "Smart-phone"), such as an analog or digital clock display, or a calendar display, etc. Also, users want to be able to customize the display of these services to meet their own special needs. As such, some users want to be able to design the "look and feel" for their own mobile phones. However, existing mobile phone systems either do not provide these user viewing capabilities or they are provided in inconsistent and inconvenient ways. As described below, the present invention successfully resolves these problems.

SUMMARY OF THE INVENTION

In accordance with a preferred embodiment of the present invention, a mobile phone user can select one or more service preferences for the mobile phone from a simulated mobile phone display on an Internet web page. The user can access the web page from a personal or business computer. Once the selection has been made, the user can save the preferences to a server in the mobile phone network. The server contains (or provides links to) the full complement of services that are available for selection. The selected services' applications are downloaded from the server to the mobile phone (via the network) either immediately (if a network connection is already made) or the next time the phone is turned on. Consequently, the user can readily obtain the services desired, and also customize the display and "look and feel" of the mobile phone.

An important technical advantage of the present invention is that users can conveniently view and obtain the exact services they desire for their mobile phones.

Another important technical advantage of the present invention is that users can readily access the WWW to view and select the services they desire to use on their mobile phones.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
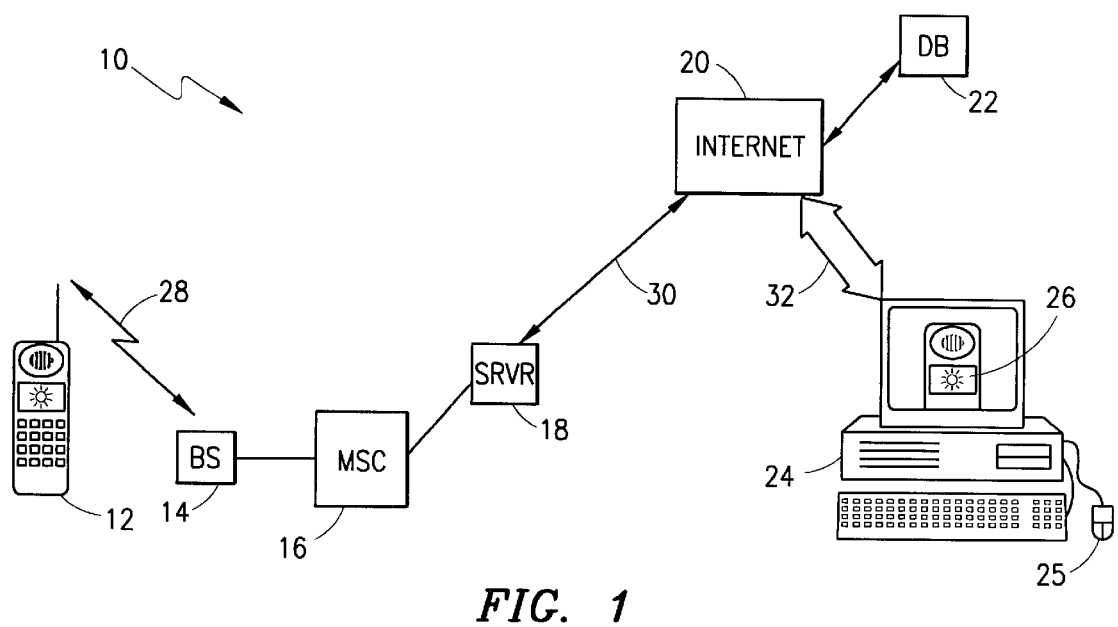
FIG. 1 is a block diagram of an exemplary system that can be used to implement a method for using an Internet to select and control mobile phone user views, in accordance with a preferred embodiment of the present invention.
Figure 2:
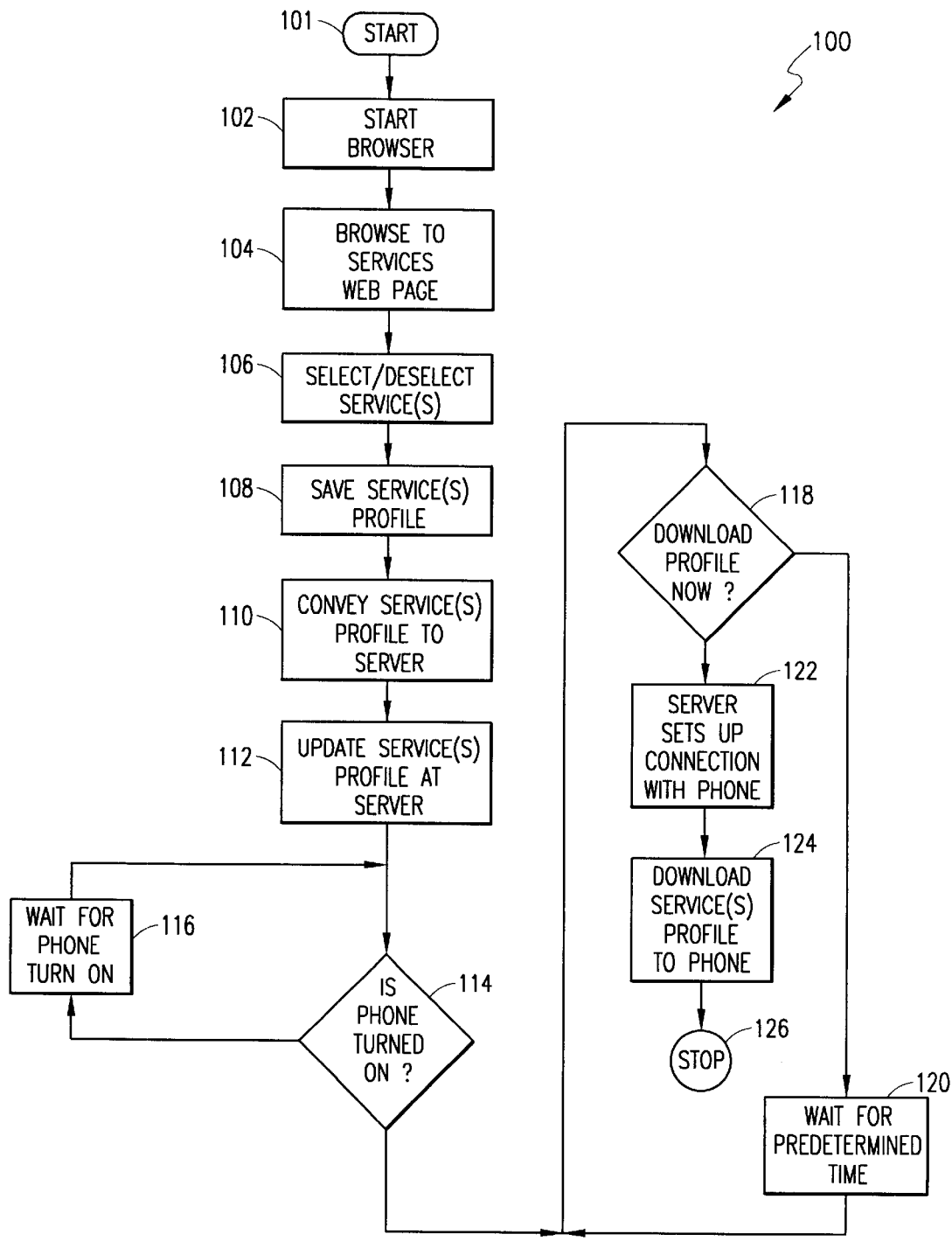
FIG. 2 is a flow diagram that illustrates the exemplary method implemented in the system of FIG. 1.

The preferred embodiment of the present invention and its advantages are best understood by referring to FIGS. 1–2 of the drawings, like numerals being used for like and corresponding parts of the various drawings.

Essentially, in accordance with a preferred embodiment of the present invention, a mobile phone user can select one or more service preferences for the mobile phone from a simulated mobile phone display on an Internet page. For this embodiment, the page can be a WWW web page. The user can access the web page from a personal or business computer. Once the selection has been made, the user can save the preferences to a server in the mobile phone network. The server contains (or provides links to) the full complement of services that are available for selection. The selected services are downloaded as applications from the server to the mobile phone (via the network) either immediately (if a network connection is already made) or the next time the phone is turned on. Consequently, the user can readily obtain the services desired, and also customize the display and "look and feel" of the mobile phone.

Specifically, FIG. 1 is a block diagram of an exemplary system (10) that can be used to implement a method for using an Internet to select and control mobile phone user views, in accordance with a preferred embodiment of the present invention. FIG. 2 is a flow diagram that illustrates the exemplary method. Referring to FIGS. 1 and 2, at step 102 of method 100, the user or subscriber (or agent of the user/subscriber) of mobile phone 12 starts a conventional browser with computer 24. Computer 24 can be any type of conventional computer (e.g., personal computer, laptop, notebook, medium size, general purpose computer, etc.) that provides access via a data link 32 to an Internet 20, such as the WWW. At step 104, the user directs the browser (typically by "clicking" on a link or typing in a Universal Resource Locator or URL) to a mobile phone services front page. If the Internet 20 being accessed is the WWW, then the browser can be directed to a mobile phone services web page. The content of the mobile phone services web page can be provided by the user's mobile phone network operator (or some third party that can provide such services for the operator) and stored in a database 22 associated with the Internet service provider (ISP). As such, instead of having to access the web site directly on the Internet, the browser can access an "extranet" server that can be used as a "mirror" of the web site. The "mirror" server can be connected to different databases (including, for example, a mobile phone services database). However, these databases are preferably consistent in type and format, etc. Nevertheless, the format of the mobile phone services web page does not have to be completely consistent with such databases. In other words, there can be slightly different lists of applications on a number of different web pages.

For this embodiment, the mobile phone services web page preferably includes a virtual display (e.g., identical to display 26 as viewed on the monitor of computer 24), which simulates (or even emulates) the display of the mobile phone 12. For example, the virtual display (26) can look substantially the same, and have the same proportions, as the "real" display (12). Also, the web page preferably includes a list of applications and/or services that can be provided for the user. These applications may or may not be run as part of the mobile phone display simulation (if an application is a "Java" application, it can be run as part of the simulation). It is also possible for one or more third party developers to publish their applications on this mobile phone services web page. Additionally, this web page preferably includes pertinent control buttons, such as, for example, a "save " button, "cancel " button, "delete " button, etc.

At step 106, the user can select (or deselect) from the web page list of applications and/or services the specific applications and/or services to display and use (or not display and use) on the user's mobile phone 12. For example, the user can move a mouse 25 to "drag " an application and/or service from the list to a particular position on the display 26. In a windows-type environment, the so-selected application and/or service can be displayed as a complete window or an icon. Alternatively, the user can "click " on an icon on the display 26, which represents a particular application and/or service, and "drag " the window that appears to an appropriate location on that display. For example, this feature is useful if the user desires to display a small clock application (as shown in the display 26) at the same time a calculator is being displayed and used. Note that if the user has previously configured the display for mobile phone 12 (or, for example, a default configuration is displayed), the applications that are already displayed on the mobile phone 12 also appear on the virtual display 26. Consequently, the user can use the virtual display to deselect or delete one or more of those previous applications.

At step 108, when the user decides to save the service profile (preferences selected and/or deselected), the user can "click " on the "save " button shown on display 26. At step 110, the browser conveys the resulting services profile from the computer 24 to the Internet 20. The Internet 20 then conveys the services profile to a server (e.g., including a profile database) 18 that preferably maintains all users' service profiles via the data connections 32 and 30. for example, these data connections can carry out communications in accordance with the TCP/IP protocol. At step 112, the server (profile database) 18 is updated with the new service profile for the user of mobile phone 12. Although this exemplary embodiment shows a single service profile database (18), a distributed type of database (e.g., multiple associated databases and servers) can be used.

At step 114, the profile server 18 communicates with a mobile services switching center (MSC) 16 in the mobile phone network using, for example, the framework for the mobile application part (MAP) protocol. In this illustrative case, the mobile phone network can be a Global System for Mobile Communications (GSM) network. As such, the server 18 can check with the MSC 16 and determine if the mobile phone 12 is turned on (or, alternatively, whether the user has the phone turned off). In this regard, the mobile phone 12 can be a mobile radiotelephone, a fixed telephone operating in a mobile network, a wireless computer with telephone capabilities, etc. Note that the type of telephone capability used for phone 12 is not intended to so limit the present invention, as long as the telephone capability used includes an appropriate user service display. If, at step 114, the server 18 determines from the MSC 16 that the mobile phone 12 is not turned on, then at step 116, the server 18 regularly polls the MSC 16 until information is received that the phone is turned on.

If the phone 12 is turned on, at step 118, the server 18 checks the preferences set by the user to determine if the service application(s) should be downloaded immediately, or if the user has selected to initiate the downloading. For example, at step 120, the server 18 could download the service application(s) late at night when the user is not using the phone 12. Alternatively, the server 18 could send a message to the mobile phone 12 via the MSC 16, the base station (BS) 14, and the air interface 28, which informs the user (preferably by the phone's display) that a new version of an existing service application is available for downloading. The user can thus determine whether or not to have the new version downloaded, preferably using a "smart " versioning system, such as, for example, Marimba's Castanet™.

At step 122, when the user decides to have new application software downloaded, the server 18 prompts the MSC 16 to set up a call connection between the server 18 and the mobile phone 12. Preferably, for this embodiment, at step 124, the software code is downloaded through this connection. A processor in the mobile phone installs the downloaded application software in the phone. For example, the application software being executed in the mobile phone can comprise an operating system with Java functionality. In other words, the mobile phone 12 would then have a Java Virtual Machine implemented either in software or hardware.

Also, the mobile phone 12 preferably includes a cache (memory) where the applications for the installed services are stored. If the cache becomes filled, the user can be so informed by looking at the display, and the user (or the server 18) can choose whether or not to delete some of the resident applications. Notably, it is possible that the user may desire to run an application that is not presently installed on the phone 12. In that case, the application can be fetched from the server 18 (or from a database at a different location from the server) in real-time.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for selecting services for use in a phone in a mobile network, comprising the steps of:

accessing a web site on an Internet, said web site including a display of at least one of a plurality of phone services;

selecting a service application from said display of at least one of a plurality of phone services;

saving said service application in a database associated with said mobile network;

determining a status of said phone, said status defining an on-state and an off-state for said phone;

checking user preferences stored in said mobile network while said phone is in said on-state; and responsive to said step of checking, downloading an application associated with said service application from said database to said phone, based on said user preferences.

2. The method of claim 1, wherein the downloading step comprises downloading at least one preference change for an application residing in said phone.

3. The method of claim 2, wherein said preference change comprises at least a change to an image for display.

4. The method of claim 1, wherein the accessing step comprises using a browser to access a web page on the WWW.

5. The method of claim 1, wherein said downloading step comprises downloading said application when said phone is turned on.

6. The method of claim 1, wherein said downloading step comprises downloading said application at a predetermined time.

7. The method of claim 1, wherein said saving and downloading steps comprise:

saving a service profile in said database; and downloading at least one application associated with said service profile from said database to said phone.

8. The method of claim 1, wherein said phone comprises a mobile phone.

9. The method of claim 1, wherein the selecting and downloading steps comprise:

deselecting a service application from said display of at least one of a plurality of phone services;

saving an identity of said service application in a database associated with said mobile network;

downloading said identity of said service application from said database to said phone; and deleting said service application from use in said phone.

10. The method of claim 1, wherein the downloading step comprises setting up a connection to said phone; and downloading said application from said database to said phone via said connection.

11. The method of claim 1, wherein said display comprises a virtual display for said phone.

12. The method of claim 1, further comprising the step of simulating said selected service application on said web site.

13. The system of claim 1, wherein the step of selecting is independent of a network operator.

14. The method of claim 1, further comprising the step of publishing a third-party service application on said web site.

15. A system for use in selecting services for a phone in a mobile network, comprising:

a web site including a display of at least one of a plurality of phone services;

means for selecting a service application from said display of at least one of a plurality of phone services, coupled to said web site;

a database coupled to said mobile network and said web site, for saving said selected service;

means for determining a status of said phone, said status defining an on-state and an off-state for said phone;

means for checking user preferences stored in said mobile network, while said phone is in said on-state; and means for downloading an application associated with said service application from said database to said phone, based on said user preferences.

16. The system of claim 15, wherein said selecting means includes a browser.

17. The system of claim 15, wherein said downloading means includes a server coupled between a WWW and a mobile services switching center in said mobile network.

18. The system of claim 15, wherein said service application comprises part of a service profile associated with said phone.

19. The system of claim 15, wherein said phone comprises a mobile phone.

20. The system of claim 15, wherein said display comprises a virtual display for said phone.

21. The system of claim 15, further comprising a means for simulating said selected service application on said web site.

22. The system of claim 15, wherein said means for selecting is independent of a network operator.

23. The system of claim 15, further comprising a means for publishing a third-party service application on said web site.

* * * * *